(12) United States Patent
Hayashi

(10) Patent No.: US 7,672,127 B2
(45) Date of Patent: Mar. 2, 2010

(54) INFORMATION PROCESSING DEVICE AND MANUFACTURING METHOD OF THE INFORMATION PROCESSING DEVICE

(75) Inventor: Nobutake Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/238,561

(22) Filed: Sep. 26, 2008

(65) Prior Publication Data

US 2009/0034171 A1 Feb. 5, 2009

Related U.S. Application Data

(62) Division of application No. 11/536,217, filed on Sep. 28, 2006, now Pat. No. 7,471,513.

(30) Foreign Application Priority Data

Oct. 25, 2005 (JP) ............................. 2005-310548

(51) Int. Cl.
H05K 7/20 (2006.01)

(52) U.S. Cl. ...................... 361/695; 361/700; 454/184

(58) Field of Classification Search . 361/679.49–679.5, 361/694, 695; 454/184

See application file for complete search history.

(56) References Cited

U.S. PATENT DOCUMENTS

| | | | |
|---|---|---|---|
| 5,956,227 A * | 9/1999 | Kitaoka | ........................ 361/695 |
| 6,721,180 B2 * | 4/2004 | Le et al. | ...................... 361/695 |
| 6,778,394 B2 | 8/2004 | Oikawa et al. | |
| 6,822,863 B1 | 11/2004 | Artman et al. | |
| 6,888,725 B2 | 5/2005 | Kubo et al. | |
| 6,889,752 B2 * | 5/2005 | Stoller | ......................... 165/47 |
| 7,028,753 B2 * | 4/2006 | Sterner | ...................... 165/80.3 |
| 7,226,353 B2 * | 6/2007 | Bettridge et al. | ............. 454/184 |
| 7,254,022 B2 * | 8/2007 | Ebermann | ................... 361/696 |
| 7,312,992 B2 | 12/2007 | Jory et al. | |
| 2005/0195568 A1 | 9/2005 | Shyr | |
| 2005/0259393 A1 * | 11/2005 | Vinson et al. | ................ 361/690 |
| 2006/0181846 A1 | 8/2006 | Farnsworth et al. | |

FOREIGN PATENT DOCUMENTS

| | | |
|---|---|---|
| JP | 2003-108269 | 4/2003 |
| JP | 2003-283171 | 10/2003 |

\* cited by examiner

*Primary Examiner*—Gregory D Thompson
(74) *Attorney, Agent, or Firm*—Oblon, Spivak, McClelland, Maier & Neustadt, L.L.P.

(57) ABSTRACT

An information processing device includes a housing part; a heating part arranged in the housing part; a cooling unit configured to cool the heating part; an airflow supplying member configured to supply an airflow to the cooling unit; and an airflow limitation member configured to limit the airflow supplied by the airflow supplying member. A part of the cooling unit, the airflow limitation member, and the airflow supplying member are arranged in series. An air intake part is provided in one surface of the housing part so as to intake air into the airflow limitation member. An air discharge part is provided in another surface of the housing part so as to discharge air cooling the part of the cooling unit. An air discharge unit is provided at an air discharge opening provided at one side surface of the airflow limitation member.

7 Claims, 10 Drawing Sheets

(A)

(B)

INFORMATION PROCESSING DEVICE AND MANUFACTURING METHOD OF THE INFORMATION PROCESSING DEVICE

CROSS-REFERENCE TO RELATED APPLICATIONS

This application is a Division of and claims the benefit priority from U.S. Ser. No. 11/536,217, filed Sep. 28, 2006 now U.S. Pat. No. 7,471,513, which claims the benefit of priority from Japanese Patent Application No. 2005-310548, filed Oct. 25, 2005, the entire contents of each of which are incorporated herein by reference.

BACKGROUND OF THE INVENTION

1. Field of the Invention

The present invention generally relates to information processing devices and manufacturing methods of the information processing devices, and more particularly, an information processing device having a cooling mechanism for a heating part such as a CPU (Central Processing Unit) and a manufacturing method of the information processing device.

2. Description of the Related Art

Accompanying the spread of the Internet and improvement in CPUs (Central Processing Unit) and the like, a process such as image processing or motion picture processing is frequently performed by using a personal computer or a computer made exclusively for the process. Such a process places a heavy workload on the CPU.

Although performance of the CPU is being improved day by day, if the process for placing the heavy workload on the CPU is continuously performed, the CPU is heated so as to have a high temperature. This causes degradation of the performance of the CPU.

In addition, as the performance of the CPU is improved and the CPU works at a low voltage, consumption of electrical current in the CPU is increased. This causes an increase of temperature of a power control element for supplying electric power to the CPU.

In order to solve the above-discussed problem, Japanese Laid-Open Patent Application Publication No. 2003-108269 discloses the following structure for cooling of electronic parts. That is, a high temperature area contains a CPU, a chip set, a memory, and a graphic board. A low temperature area contains a power supply and drives for driving an external storage medium. The temperature areas are separated by a partition wall. The high temperature area is cooled by a CPU cooling fan, a heat sink and an additional fan, and the low temperature area is cooled by a power supply fan. The partition wall is formed by a riser board and a riser bracket.

However, in the technique disclosed in Japanese Laid-Open Patent Application Publication No. 2003-108269, there is limitation of lay-out when an electronic component is mounted on an SMT (Surface Mount Technology) board. Hence, design freedom of a surface mount design is lost. In addition, Japanese Laid-Open Patent Application Publication No. 2003-108269 does not discuss how hot air dispersed by a CPU cooling fan is discharged to the outside of the computer.

Furthermore, the power control element requires controlling a large amount of electric current. For example, approximately 100 A may be required for the operation of recent CPUs. Such a power control element may be required to be arranged in the vicinity of the CPU so that there is little influence of impedance of a wiring pattern. Effective heat transfer from these elements may be required.

SUMMARY OF THE INVENTION

Accordingly, embodiments of the present invention may provide a novel and useful information processing device and manufacturing method of the information processing device in which the above-mentioned problems are eliminated.

More specifically, the embodiments of the present invention may provide an information processing device having a cooling mechanism for a heating part such as a CPU (Central Processing Unit) or a power control element whereby hot air is securely discharged from inside of a housing part of the information processing device without loss of design freedom of a board mounting process and a manufacturing method of the information processing device.

The embodiments of the present invention may provide an information processing device, including a housing part; a heating part arranged in the housing part; a cooling unit configured to cool the heating part; an airflow supplying member configured to supply an airflow to the cooling unit; and an airflow limitation member configured to limit the airflow supplied by the airflow supplying member; wherein a part of the cooling unit, the airflow limitation member, and the airflow supplying member are arranged in series; an air intake part is provided in one surface of the housing part so as to intake air into the airflow limitation member; an air discharge part is provided in another surface of the housing part so as to discharge air cooling the part of the cooling unit; and an air discharge unit is provided at an air discharge opening provided at one side surface of the airflow limitation member.

An air filter may be provided at the air discharge opening provided at the side surface of the airflow limitation member. The housing part may include a second air intake part different from the air intake part and a second air discharge part different from the air discharge part; and heat generated at the heating part and a part other than the hearing part may be discharged from the second discharge part to an outside of the housing part. The airflow limitation member may include a notch part; and the airflow supplying member or the cooling unit and a bottom surface of the airflow limitation member may not come in contact with each other when the airflow limitation member is installed. A cooling unit fixing part may be provided so as to fix a part of the cooling unit; and the cooling unit fixing part may include a receiving part as a lid for a notch part provided at the airflow limitation member. The airflow supplying member may have a structure where an internal diameter at a side of the air intake part is larger than an internal diameter at a side of the air discharge part.

The embodiments of the present invention may also provide an information processing device, including: a housing part; a heating part arranged in the housing part; a cooling unit configured to cool the heating part; an airflow supplying member configured to supply an airflow to a part of the cooling unit; and an airflow limitation member configured to limit the airflow supplied by the airflow supplying member; wherein an air intake part is provided in one surface of the housing part so as to intake air into the airflow limitation member; an air discharge part is provided in another surface of the housing part so as to discharge air cooling the part of the cooling unit; the airflow limitation member includes a duct main body and a supplemental duct; the duct main body and the part of the cooling unit are arranged in series; and the supplemental duct is connected to an air discharge opening provided at one side surface of the airflow limitation member.

The embodiments of the present invention may also provide an information processing device, including a housing part; a heating part arranged in the housing part; a cooling unit configured to cool the heating part; an airflow supplying member configured to supply an airflow to a part of the cooling unit; and an airflow limitation member configured to limit the airflow supplied by the airflow supplying member; wherein an air intake part is provided in one surface of the housing part so as to intake air into the airflow limitation member; an air discharge part is provided in another surface of the housing part so as to discharge air cooling the part of the cooling unit; the airflow limitation member includes a duct main body and a supplemental duct; the duct main body and the part of the cooling unit are arranged in series; and the supplemental duct is connected to an air discharge opening provided at one side surface of the airflow limitation member and an air filter is provided at the air discharged opening.

The embodiments of the present invention may also provide a manufacturing method of an information processing device, the information processing device, including: a housing part; a heating part arranged in the housing part; a cooling unit configured to cool the hearing part; an airflow supplying member configured to supply an airflow to the cooling unit; and an airflow limitation member configured to limit the airflow supplied by the airflow supplying member; wherein a part of the cooling unit, the airflow limitation member, and the airflow supplying member are arranged in series; an air intake part is provided in one surface of the housing part so as to intake air into the airflow limitation member; an air discharge part is provided in another surface of the housing part so as to discharge air cooling the part of the cooling unit; and an air discharge unit is provided at an air discharge opening provided at one side surface of the airflow limitation member; the manufacturing method comprising the steps of: providing the heating part in the housing part; providing the part of the cooling unit configured to cool the heating part and the airflow supplying member configured to supply the airflow to the part of the cooling unit, in a cooling unit fixing part having a receiving part; contacting other part of the cooling unit and the heating part; providing the airflow limitation member having a structure where a designated notch part is provided at a side contacting the cooling unit fixing part by rotating the airflow limitation member where a fulcrum of the rotation is provided at a side opposite to a side where the notch part is provided; and covering the notch part of the airflow limitation member with the receiving part of the cooling unit fixing part.

The embodiments of the present invention may also provide a manufacturing method of an information processing device, the information processing device including: a housing part; a heating part arranged in the housing part; a cooling unit configured to cool the hearing part; an airflow supplying member configured to supply an airflow to a part of the cooling unit; and an airflow limitation member configured to limit the airflow supplied by the airflow supplying member; wherein an air intake part is provided in one surface of the housing part so as to intake air into the airflow limitation member; an air discharge part is provided in another surface of the housing part so as to discharge air cooling the part of the cooling unit; the airflow limitation member includes a duct main body and a supplemental duct; the duct main body and the part of the cooling unit are arranged in series; and the supplemental duct is connected to an air discharge opening provided at one side surface of the airflow limitation member; the manufacturing method including the steps of: providing the heating part in the housing part; providing the part of the cooling unit configured to cool the heating part and the airflow supplying member configured to supply the airflow to the part of the cooling unit, in a cooling unit fixing part having a receiving part; contacting another part of the cooling unit and the heating part; providing the airflow limitation member having a structure where a designated notch part is provided at a side contacting the cooling unit fixing part by rotating the airflow limitation member where a fulcrum of the rotation is provided at a side opposite to a side where the notch part is provided; and covering the notch part of the airflow limitation member with the receiving part of the cooling unit fixing part.

According to the embodiments of the present invention, it is possible to cool the heating part and securely discharge hot air from inside the housing part of the information processing device without losing the design freedom of the board mounting process.

Other objects, features, and advantages of the present invention will become more apparent from the following detailed description when read in conjunction with the accompanying drawings.

DETAILED DESCRIPTION OF THE PREFERRED EMBODIMENTS

A description of the present invention is now given, with reference to FIG. 1 through FIG. 13, including embodiments of the present invention. FIG. 1 through FIG. 6 are structural views for explaining an example of an information processing device 1 where a cooling mechanism of the present invention is applied. FIG. 7 through FIG. 13 are concrete structural views of the cooling mechanism of the embodiments of the present invention.

Figure 1:
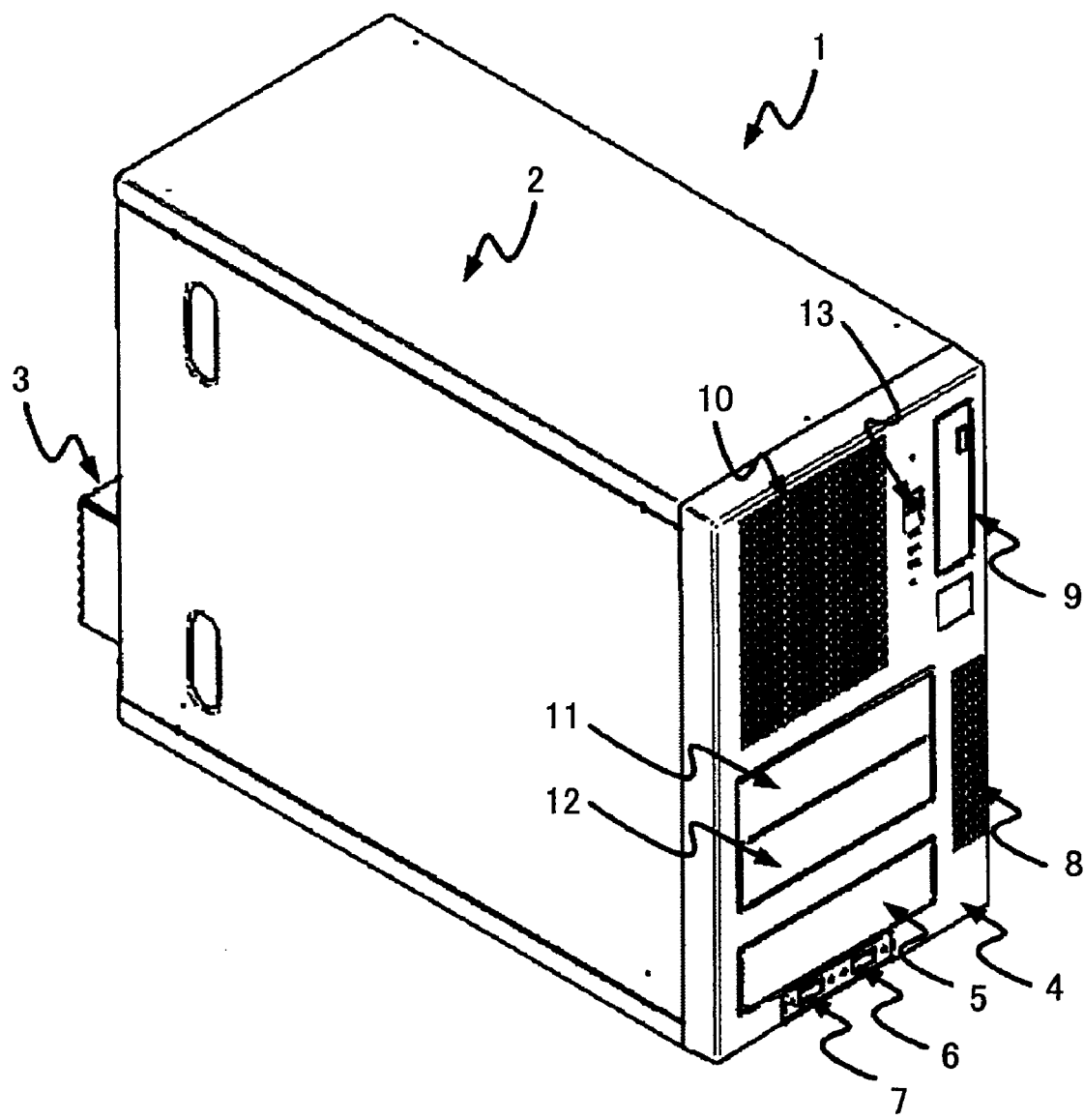
FIG. 1 is a perspective view of an information processing device where a cooling mechanism of the present invention is applied.

FIG. 1 is a perspective view of the information processing device 1 where the cooling mechanism of the present invention is applied.

The information processing device 1 includes an upper part cover 2 and a fan installing part 3. The upper part cover 2 forms a part of a housing part. A fan for cooling the inside of the housing part is contained in the fan installing part 3.

A first air intake part 10 and a second air intake part 8 having a large number of air intake holes are provided in a front surface cover 4 of the information processing device 1. Filters are provided at rear surfaces of the first air intake part 10 and the second air intake part 8 so that foreign particles are prevented from being introduced into the housing part. In addition, a five-inch removable battery unit 5, USB (Universal Serial Bus) terminals 6 and 7, a floppy disk (registered trademark) drive 9, five-inch optical disk drives 11 and 12, and a electric power switch 13 are provided at the front surface cover 4.

Figure 2:
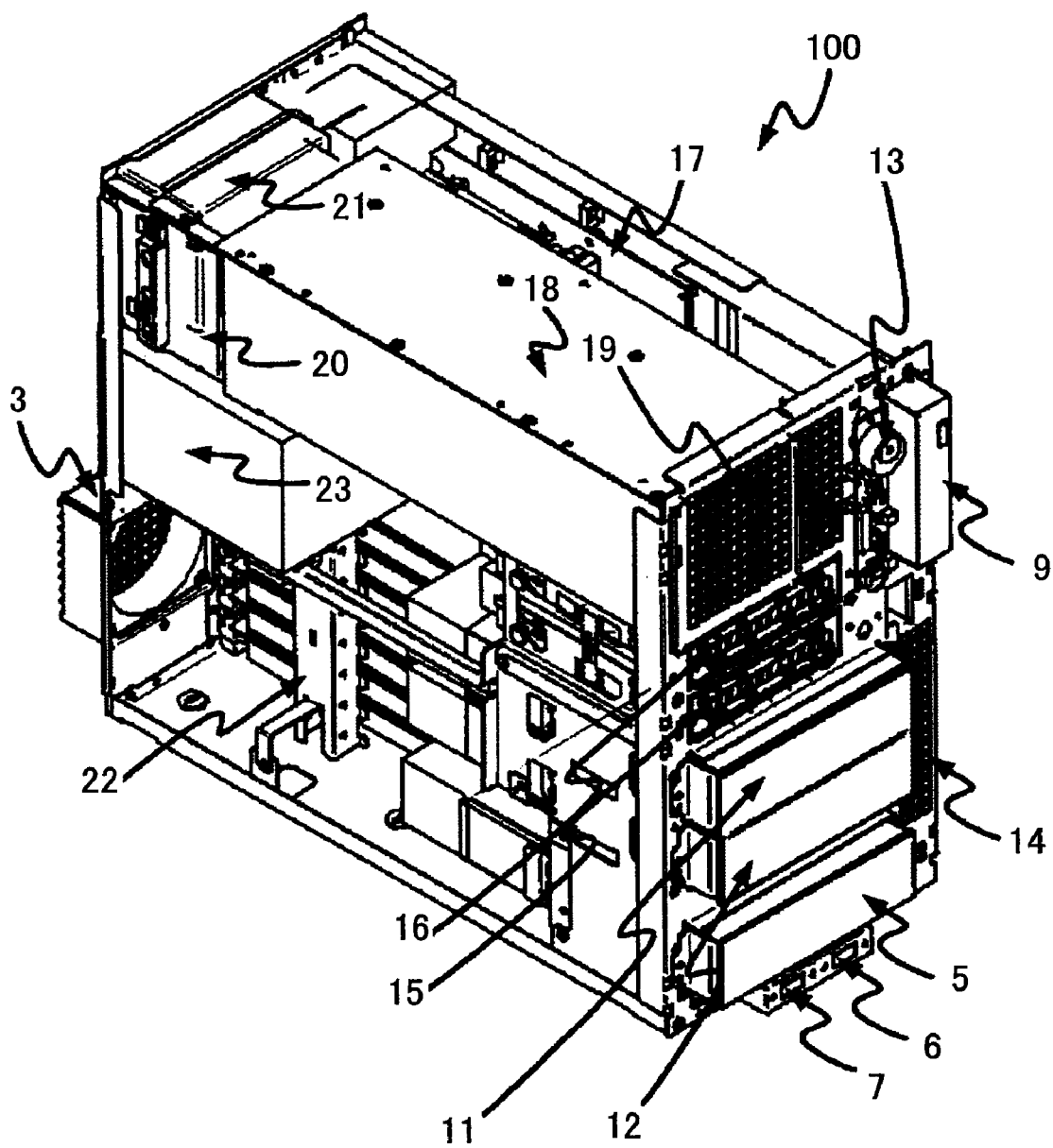
FIG. 2 is a perspective view showing an appearance of the inside of a housing part of the information processing device having a CPU cooling unit.

FIG. 2 is a perspective view showing the appearance of the inside of a housing part of the information processing device having a CPU cooling unit. More specifically, FIG. 2 shows a state where the upper part cover 2 and the front surface cover 4 are removed from the information processing device 1 shown in FIG. 1. In FIG. 2, parts that are the same as the parts shown in FIG. 1 are given the same reference numerals.

Referring to FIG. 2, the information processing device 1 (100) has 3.5-inch hard disk drives 15 and 16. In addition, a mother board 17 is provided along a side surface of the housing body. A CPU, a memory and the like are provided on the mother board 17. The information processing device 1 (100) has an electric power unit 23 having a generic ATX specification. A fan (not shown in FIG. 2) is installed in the electric power unit 23. In addition, the information processing device 1 (100) has an expansion card pressure foot 22 for installing an expansion card in an expansion slot of the mother board 17. In the fan installing part 3, a fan having a size of 80 mm such as a product code D08A (not shown in FIG. 2) made by NIDEC Corporation is installed.

Air taken in from the second air intake part 8 shown in FIG. 1 is taken inside of the information processing device via a second lattice 14. The air taken in from the second air intake part 8 is heated by electronic devices or electric devices provided inside of the information processing device 1 (100) and discharged by the fan installed in the fan installing part 3 and the fan of the electric power unit 23. Under this structure, heat generated by various drives 9, 11, 12, 15 and 16, the battery unit 5, electronic components (heating part) mounted on the mother board 17, and the electric power unit (heating part) 23 can be transferred to the outside of the information processing device 1 (100). A part of heat generated by the CPU (heating part) is also transferred to the outside of the information processing device 1 (100) by the fan installed in the fan installing part 3 and the fan of the electric power unit 23.

The information processing device 1 (100) also has a duct 18, a CPU cooling fan (airflow supplying member) 20, and a CPU cooling unit fixing part 21. The duct 18 is an airflow limitation member for air taken in by the first air intake part 10 and passing through the first lattice 19 pass. The duct 18 is made by sheet metal working and has a structure where the inside is a cavity. The CPU cooling fan 20 supplies airflow to a cooling unit. A fan having a size of 92 mm such as a product code 9A0912F402 made by SANYO Electric Co. Ltd is used as the CPU cooling fan 20. The CPU cooling unit fixing part 21 is provided at or in the vicinity of a rear surface of the housing body of the information processing device 1. Plural holes are formed on the rear surface of the housing body of the information processing device 1 corresponding to a part where the CPU cooling unit fixing part 21 is provided, so that the air passing through the CPU cooling unit fixing part 21 is discharged to the outside.

Next, the CPU cooling unit is discussed with reference to FIG. 3. Here, FIG. 3 is a perspective view of the CPU cooling unit used in the information processing device shown in FIG. 1.

Figure 3:
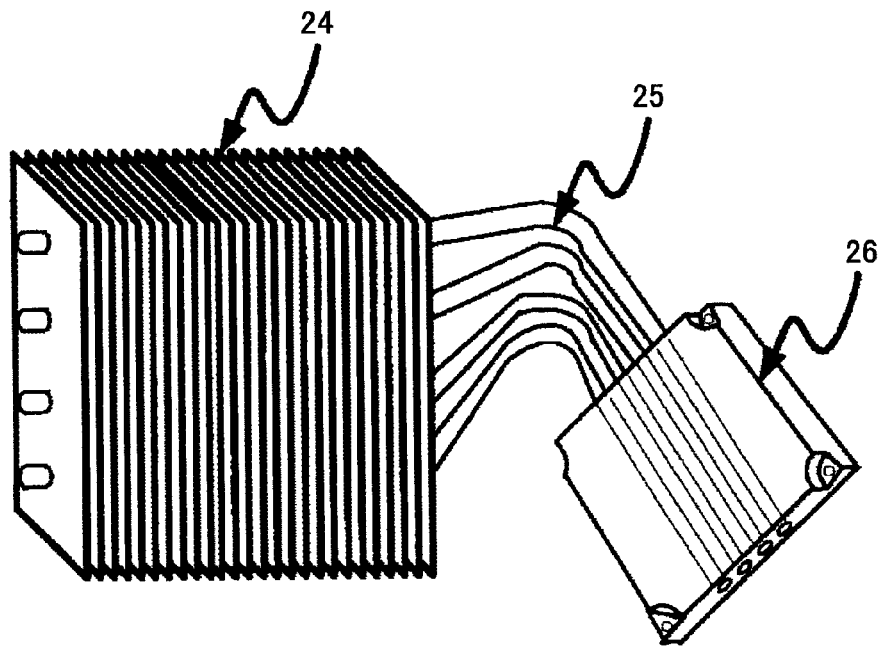
FIG. 3 is a perspective view of the CPU cooling unit used in the information processing device shown in FIG. 1.

Referring to FIG. 3, a fin 24 is formed by 47 pieces of aluminum plates. Each of the aluminum plates has a size of 95 mm×50 mm and a thickness of 0.3 mm. The fin 24 is cooled by the CPU cooling fan (airflow supplying member) 20. Four pieces of heat pipes 25 are made of copper. Each of the heat pipes 25 is filled with water. The heat pipes 24 pierce a heat receiving part 26 made of aluminum and the fin 24. The heat receiving part 26 receives heat from the CPU (not shown in FIG. 3). Heat received by the heat receiving part 26 warms the heat pipes 25 so that water in the heat pipes 25 is evaporated. Vapor in the heat pipes 25 is cooled by the fin 24 and returned to the heat receiving part 26. In addition, heat transferred to the heat pipes 25 is transferred to the fin 24. Under this structure, the heat generated by the CPU is dissipated.

Figure 4:
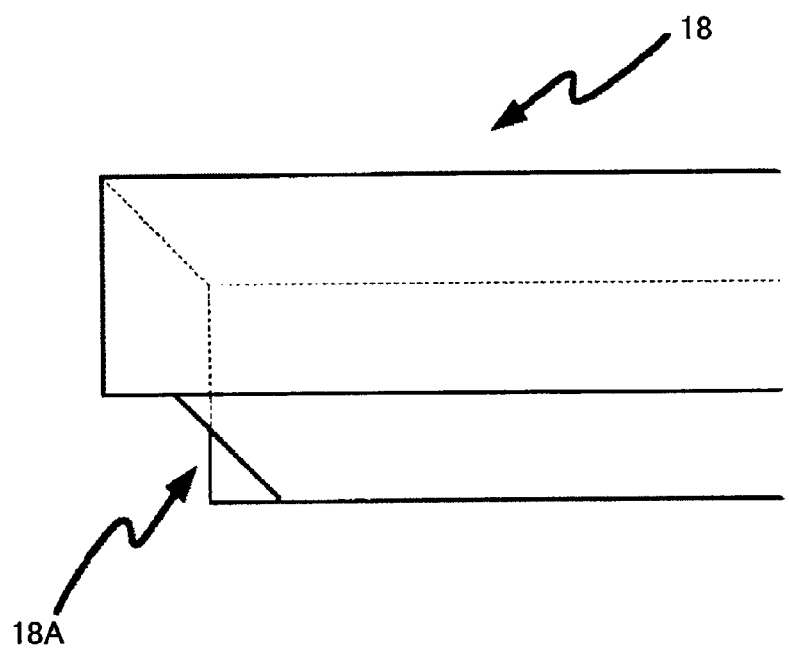
FIG. 4 is a view showing a notch part of a duct and an air discharge opening for cooling a printed circuit board used in the information processing device shown in FIG. 1.

FIG. 4 shows an end part of the duct 18. A notch part 18A is provided at a lower side of the end part of the duct 18. By the notch part 18A, it is possible to easily install the duct 18 in the information processing device 1. In other words, first, the CPU cooling fan (airflow supplying member) 20 and the CPU cooling unit fixing part 21 are provided in the information processing device 1. After that, the duct 18 is rotated in a state where a side of lattice 19 is a fulcrum of the rotation. In this case, since the notch part 18A is provided, the duct 18 can be provided in a designated position as shown in FIG. 2 without contacting the CPU cooling fan (airflow supplying member) 20 and the CPU cooling unit fixing part 21.

Figure 5:
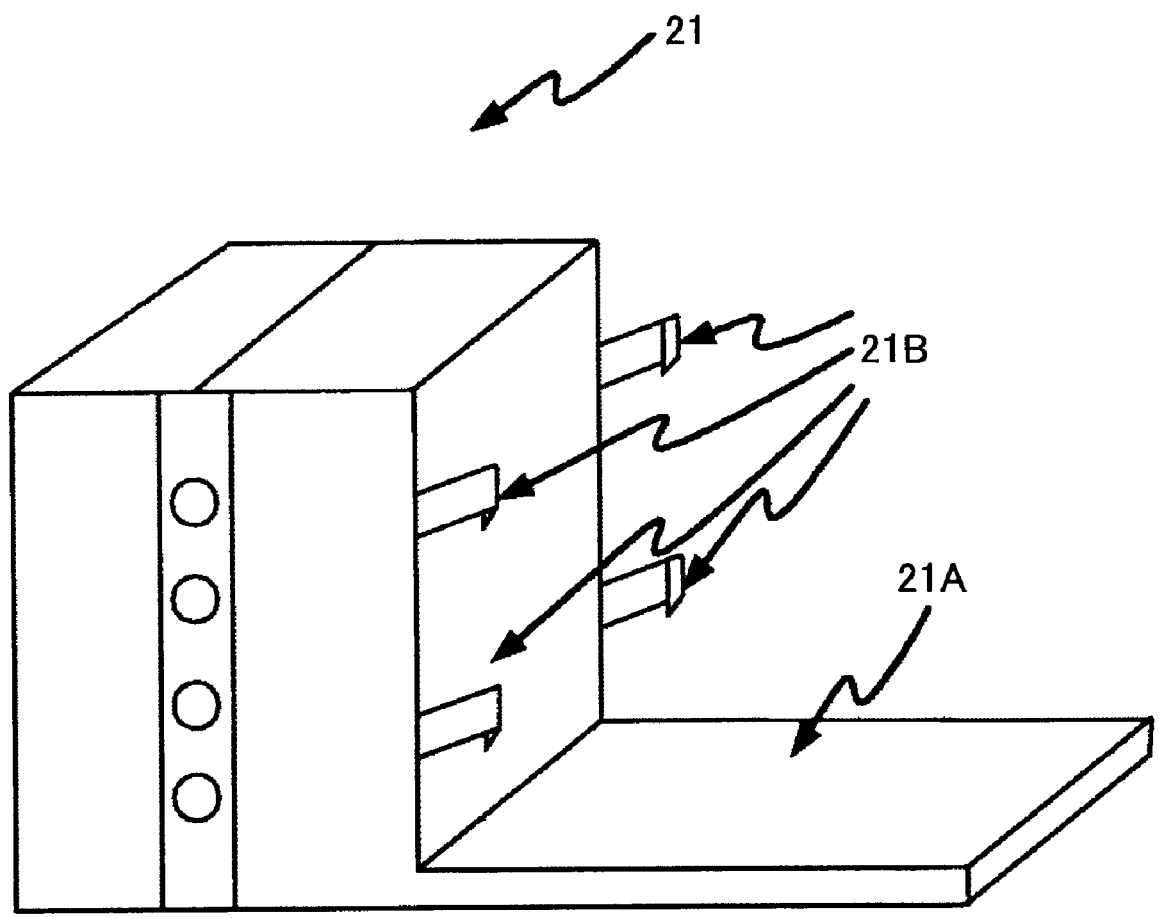
FIG. 5 is a perspective view showing the appearance of a CPU cooling unit fixing part used in the information processing device shown in FIG. 1.
Figure 6:
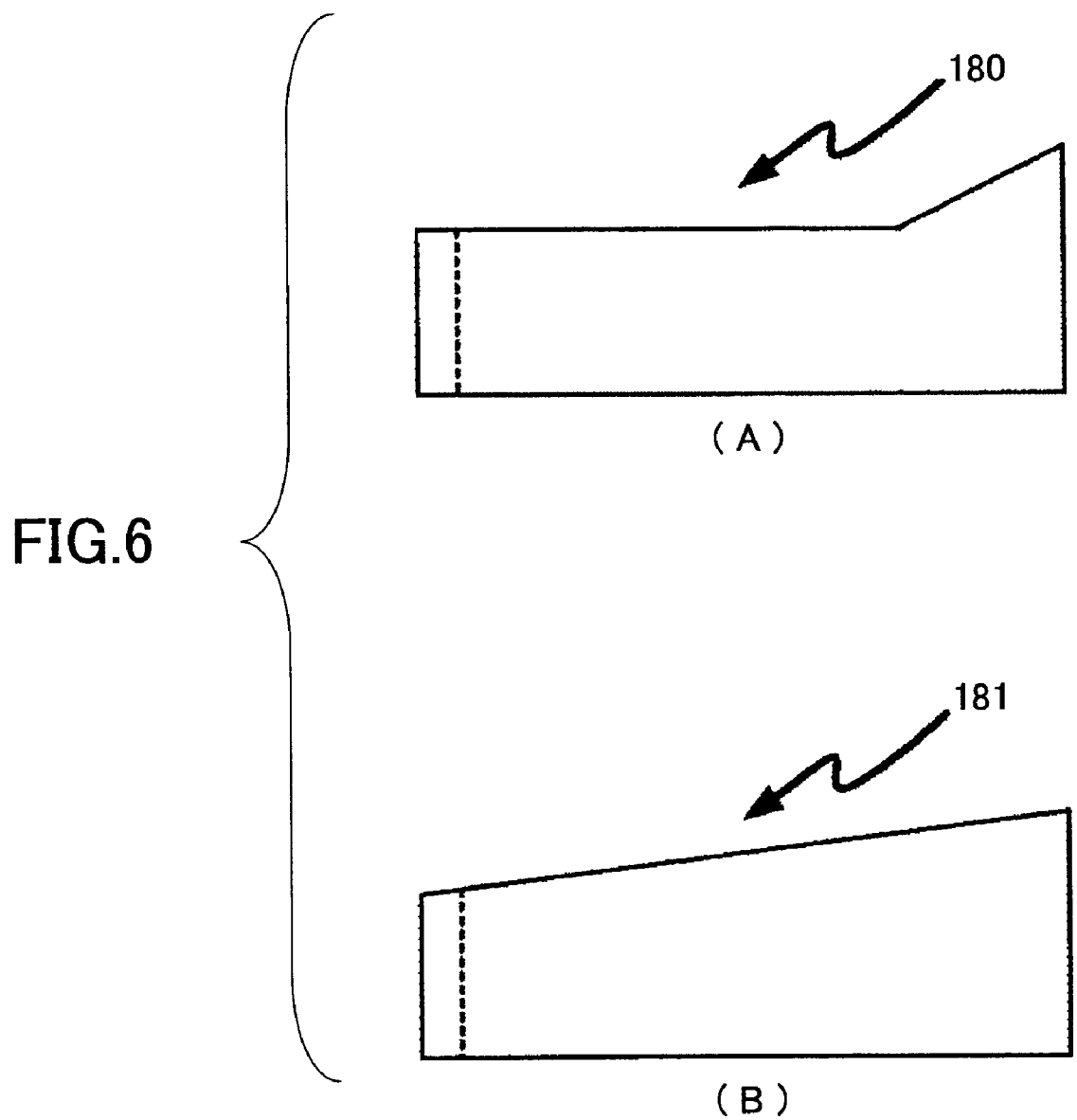
FIGS. 6(A) and (B) are views showing another example of the duct used in the information processing device shown in FIG. 1.

FIG. 5 is a perspective view showing the appearance of the CPU cooling unit fixing part 21 used in the information processing device shown in FIG. 1.

The CPU cooling unit fixing part 21 is made of ABS (acrylonitrile-butadiene-styrene copolymer) resin. The fin 24 for the CPU cooling unit is installed inside of the CPU cooling unit fixing part 21. In addition, claws 21B are provided at four portions of the CPU cooling unit fixing part 21 so that the CPU cooling fan 20 can be attached. By hanging the CPU cooling fan 20 on the claws 21B, the CPU cooling fan 20 is attached to the CPU cooling unit fixing part 21.

The CPU cooling unit fixing part 21 also has a receiving part 21A. The receiving part 21A works as a cover of the notch part 18A, so that warm air can be prevented from being taken from the notch part 18A of the duct 18 or the inside of the information processing device 1 other than the duct 18 into the duct 18 or the CPU cooling fan 20.

In other words, the air taken in from the first air intake part 10 passes through the duct 18 via the first lattice 19, enters the CPU cooling fan 20 and the CPU cooling unit fixing part 21 where heat generated by the CPU is indirectly removed, and is discharged from the rear surface of the housing body.

Thus, since the duct 18, the CPU cooling fan 20, and the CPU cooling unit fixing part 21 are arranged in series, air resistance that is an obstacle to the airflow is not formed so that the air in the duct 18 smoothly moves toward the fan 20 and the CPU can be efficiently cooled.

The information processing device 1 is manufactured by the following processes.

First, a housing body having lattices 14 and 19 is prepared. Basic components such as the mother board 17 where the CPU or the like is provided, the electric power switch 13, the electric power unit 23, the USB terminals 6 and 7 and the 80 mm cooling fan are provided in the housing body.

Next, the removable battery unit 5 and the drives 9, 11, 12, 15 and 16 are provided. The CPU cooling units 24, 25 and 26 and the CPU cooling fan 20 are provided in the CPU cooling unit fixing part 21, and then the CPU cooling unit fixing part 21 is provided in the housing body. At this time, the CPU comes in contact with the heat receiving part 26 and both of them are fixed in place with screws. After that, the duct 18 is installed as discussed above. Last, the upper part cover 2 is provided for covering so that the information processing device 1 is completed.

Instead of the duct 18 having the same internal diameter along the entire longitudinal length, a duct with the structure shown in FIGS. 6A and 6B may be used. Here, FIGS. 6A and 6B are plan views of ducts 180 and 181. The duct 180 shown in FIG. 6(A) has a structure where the size of an air intake opening is changed so as to the same (linear) on the way. The duct 181 shown in FIG. 6(B) has a structure where the size of an air intake opening is changed so as to be gradually narrowed. Under this structure, it is possible to increase the amount of air that is taken in so that a cooling effect can be achieved.

In addition, air taken in from the second air intake part 8 can transfer heat generated by mainly the drives 9, 11, 12, 15 and 16, the battery unit 5, the electronic components mounted on the mother board 17, and the electric power unit 23 to the outside. The air taken in from the first air intake part 10 can be exclusively for cooling the CPU.

Under this structure, electric devices generating a relatively small amount of heat can be cooled by the fan installed in the fan installing part 3 and the fan provided to the electric power unit 23. The CPU generating more heat than that of the other electronic devices can be efficiently cooled on a dedicated basis.

In addition, since the CPU cooling units 24, and 26 and the mother board 17 are provided separately, it is possible to relatively freely mount the electronic device on the mother board 17 in relation to the CPU.

The heat pipes 25 are filled with liquid such as water. Therefore, when vapor is cooled so as to change to liquid, it is necessary to properly return the liquid to the heat receiving part 26. Hence, the fin 24 is required to be provided in a position higher than the CPU. Accordingly, the duct 18, the CPU cooling fan 20, and the CPU cooling unit fixing part 21 are arranged on an upper part of the information processing device 1. Under this structure, as long as the CPU is not provided at the upper part of the housing body, it is possible to efficiently cool the CPU. In addition, in a case where the CPU is arranged at a lower part of the housing body, the duct 18, the CPU cooling fan 20, and the CPU cooling unit fixing part 21 can be provided at a lower part.

In this embodiment, air passing through the duct 18 is used for cooling the CPU. However, in a case where not only the CPU but also other components or units generate high heat, for example a heating part such as a chip set, are provided, such air may be used for cooling these components or unit. In this case, the heat receiving part 26 may be divided into plural parts so as to contact these components or unit. Alternatively, a single heat receiving part 26 may come in contact with both the CPU and other heating bodies concurrently. In addition, in a case where the increase of temperature of the CPU is not so large, air from the duct 18 may cool only other heating bodies.

Although air is taken in from the front surface of the information processing device 1 and air is discharged from the rear surface of the information processing device 1, the present invention is not limited to this. For example, air may be taken in from a side surface of the information processing device 1 and air may be discharged from another side surface of the information processing device 1. In other words, a limitation for preventing obstacles to the airflow may be made so that air can be smoothly taken in or discharged.

In addition, although the duct 18 is formed by sheet metal working in this embodiment, the present invention is not limited to this. For example, the duct 18 may be made of acrylonitrile-butadiene-styrene copolymer resin. Furthermore, instead of the duct 18, a circular cylinder shaped pipe can be used. In other words, limitations for preventing obstacles to airflow may be made so that air can be smoothly taken in or discharge.

Furthermore, the 92 mm fan is used as the CPU cooling fan 20 and the 80 mm fan is used as a cooling fan for cooling the entirety of the information processing device 1 in this embodiment. However, the present invention is not limited to this.

In addition, the floppy disk (registered trademark) drive 9, the removable battery 5, the optical disk drives 11 and 12, and the hard disk drives 15 and 16 are provided in this embodiment. However, these are optional and therefore there is no need to provide all of them.

Next, an embodiment of the present invention is discussed with reference to FIG. 7 through FIG. 13. In FIG. 7 through FIG. 13, parts that are the same as the parts shown in FIG. 1 through FIG. 6B are given the same reference numerals, and explanation thereof is omitted.

Figure 7:
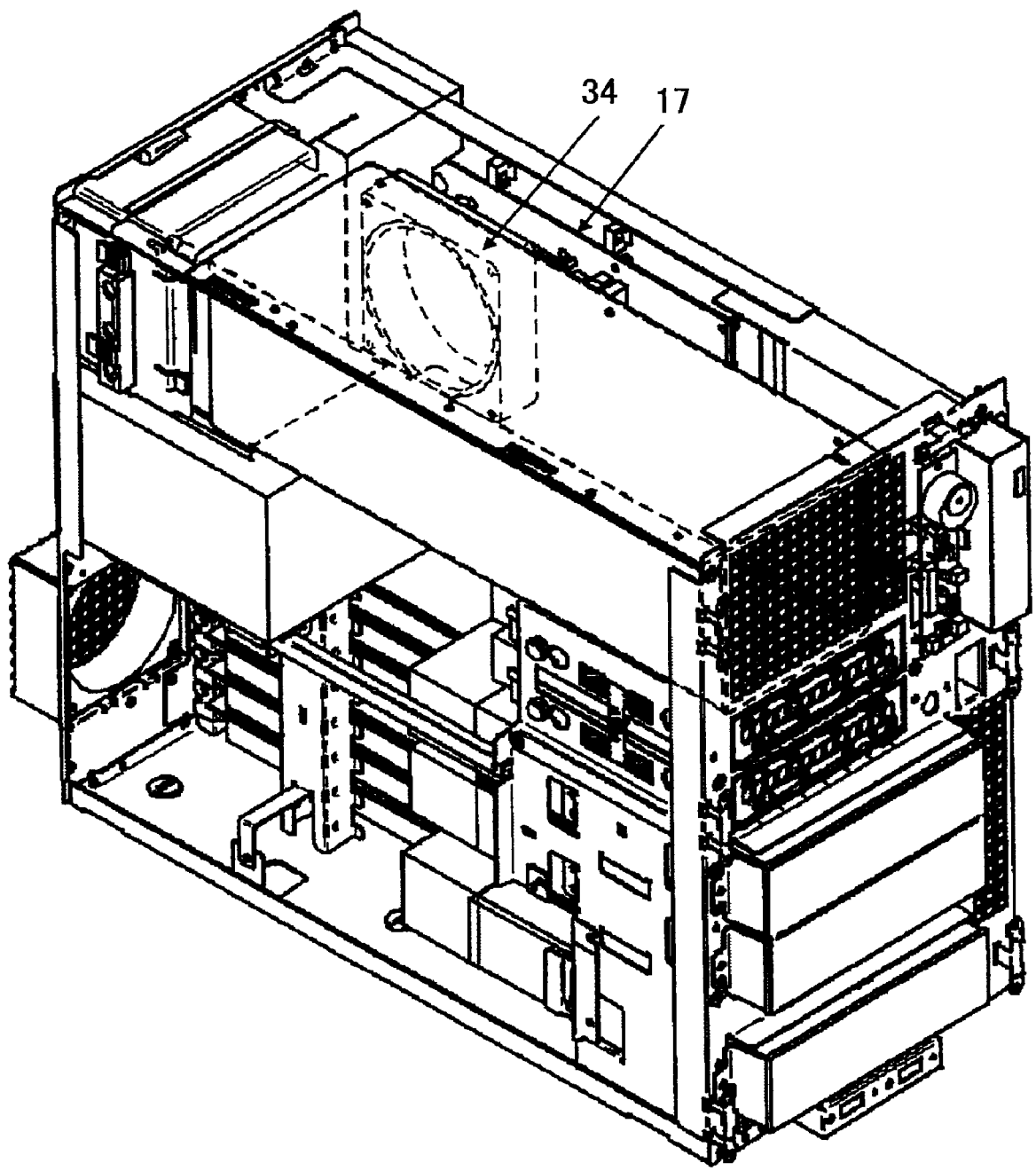
FIG. 7 is a perspective view showing the appearance of the inside of a housing part where a print circuit board cooling fan is provided of the embodiment of the present invention.

FIG. 7 is a view showing a structure of the information processing device having a cooling mechanism of the embodiment of the present invention. More specifically, FIG. 7 shows an internal structure where the upper part cover and the fort surface cover are removed.

In the cooling mechanism shown in FIG. 1 through FIG. 6B, since air taken in from the first intake part 10 can be exclusively used for cooling the CPU, cooling the CPU 33 provided on the mother board 17 can be sufficiently obtained. However, since the duct 18 forms a closed space, the airflow to the heating components in the vicinity of the CPU cannot be obtained. Hence, it is necessary to improve this point.

Figure 8:
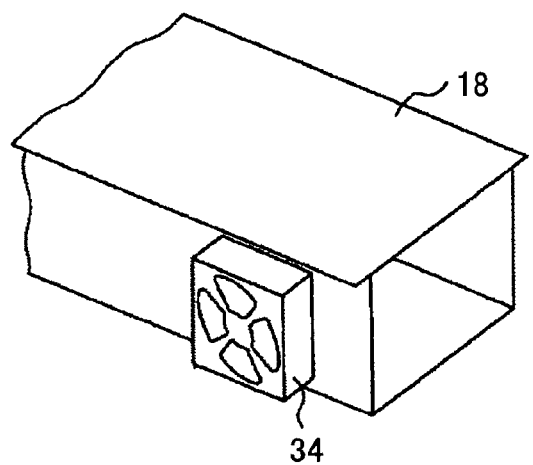
FIG. 8 is a perspective view showing a structure of the duct of the embodiment of the present invention.
Figure 9:
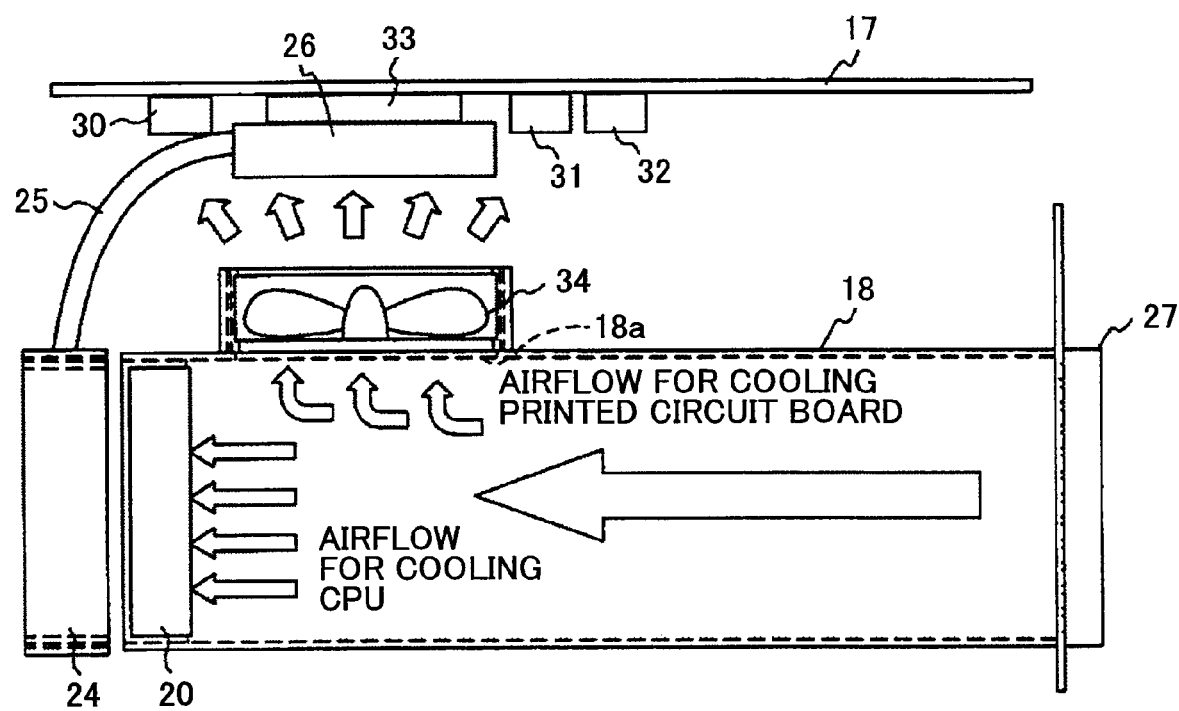
FIG. 9 is a structure explanation view for showing an example of the arrangement of the embodiment shown in FIG. 8.

In order to solve such a problem, in the structure shown in FIG. 7, the air discharge unit shown in FIG. 8 or FIG. 9 is provided at a side surface of the duct 18 so that cooling airflow to the electronic component provided in the vicinity of the CPU is provided at the same time of cooling the CPU 33.

FIG. 8 is a perspective view showing the appearance of an example of the air discharge unit (cooling unit) provided at the duct. FIG. 9 is a plan view showing a state where the air discharge unit (cooling unit) is attached to the duct.

In this air discharge unit, an air discharging opening 18a is provided at a side surface of the duct 18 for cooling the CPU 33 and the fan 34 is provided at the air discharge opening 18a. Under this structure, airflow for cooling the electric power control element in the vicinity of the CPU is sufficiently provided.

The mother board 17 that is a printed circuit board where the CPU is mounted is provided in a position facing the side surface of the duct 18 where the air discharge unit is provided. The heating elements (heating parts) 30, 31, and 32 and the CPU 33 are mounted on the mother board 17. The heat receiving part 26 contacting the CPU 33 is connected to the fin 24 via the heat pipe 25.

In an example shown in FIG. 9, a part of air flow taken in from the outside of the housing body via the first air intake part 10 and flowing in the duct 18 is directly led to a side of the mother board 17 via the air discharge unit such as the fan or blower provided at the air discharge opening 18a provided at the duct side surface so that the heating elements 30, 31 and 32 provided in the periphery of the CPU 33 generating the largest amount of heat are cooled. The airflow discharged from the air discharged opening 18a situated at the side surface of the duct 18 is discharged to the outside of the housing body via the periphery of the mother board 17 by the fan installed in the fan installing part 3.

Figure 10:
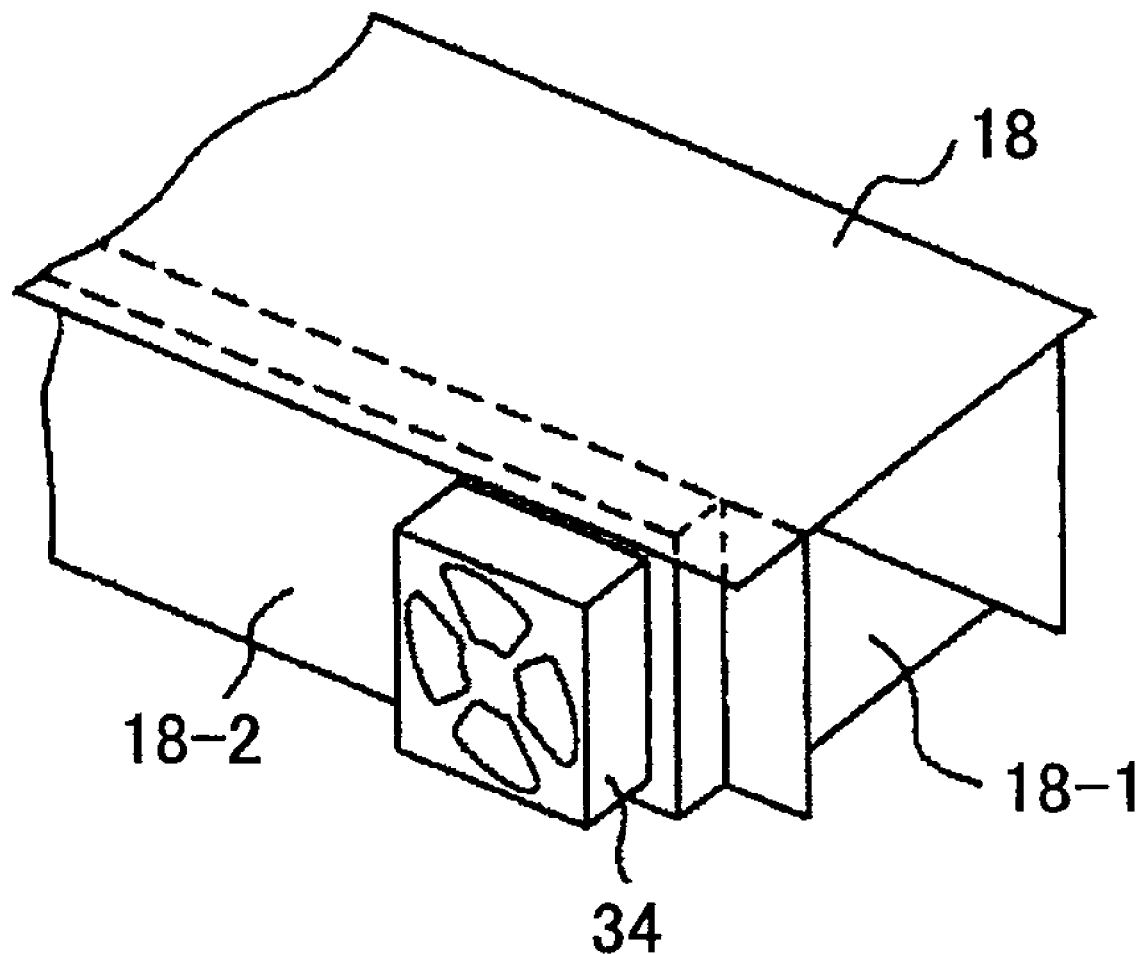
FIG. 10 is a perspective view of a duct of another embodiment of the present invention.
Figure 11:
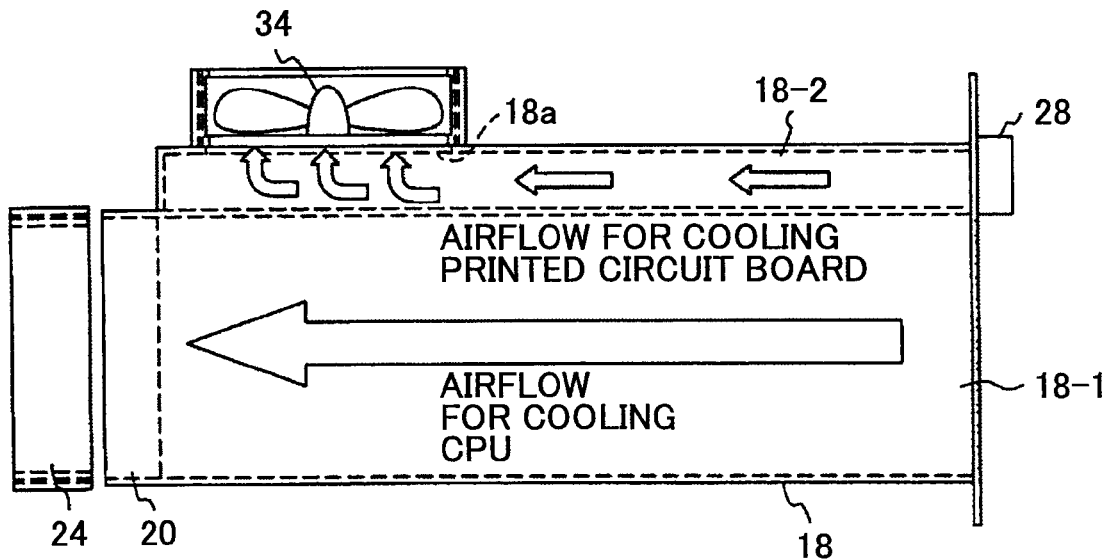
FIG. 11 is a view showing airflow and the structure of a duct of the embodiment shown in FIG. 10.

FIG. 10 and FIG. 11 show other examples of the structure of the air discharge unit. The duct 18 has a duct main body 18-1 and a supplemental duct 18-2. The CPU 33 and the circuit elements 30, 31 and 32 provided in the periphery of the CPU 33 can be cooled by air discharged from the supplemental duct 18-2 via the air discharge opening 18a. Thus, by properly dividing and securing air flow of the duct main body 18-1 and the supplemental duct 18-2, it is possible to improve the cooling effect of both the CPU 33 and the circuit elements 30, 31 and 32 provided in the periphery of the CPU 33 without endangering the cooling effect of the CPU. As a method for forming the supplemental duct 18-2, the flow path of the duct 18 may be divided into two parts or an individual duct may be provided outside of the duct 18.

Figure 12:
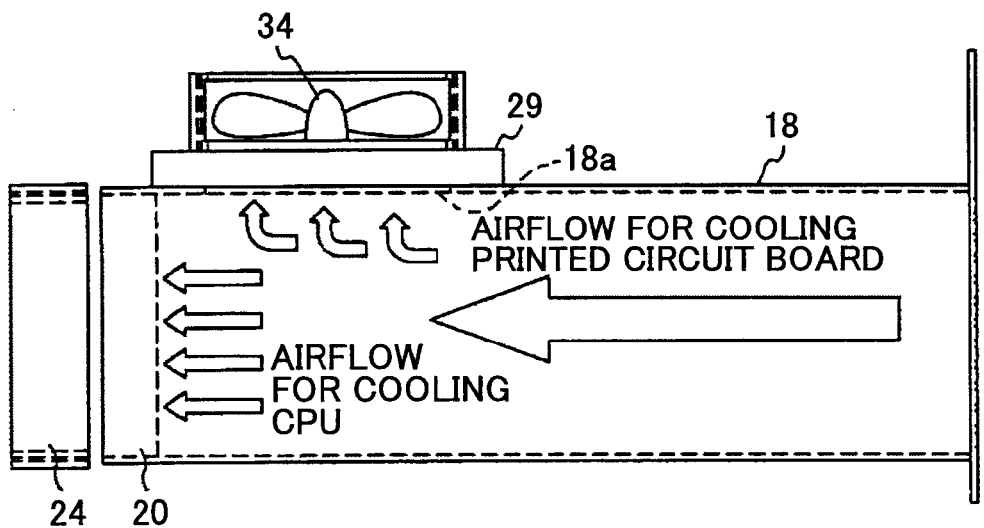
FIG. 12 is a schematic diagram showing an airflow and the structure of a duct of another embodiment of the present invention.

FIG. 12 shows a structure where the fan 34 is provided in the air discharge opening 18a of the duct 18 shown in FIG. 9 via an air filter 29. The air filter 29 removes dust in the air flowing toward the mother board 17. On the other hand, a cooling airflow of the CPU is supplied to the heat radiation part not via the air filter 29 so as to be discharged to the outside of the housing body.

By providing the air filters to the air intake opening and a side surface air discharge opening 18a of the duct, it is possible to reduce the thickness of the air filters. Therefore, air resistance can be reduced when taking air into the duct so that both a cooling effect at the side of the CPU and securing safety and reliability can be achieved.

It is preferable to remove the air filter 29 if only the cooling effect is considered. This is because while the air filter 29 prevents the entry of foreign particles, the amount and speed of airflow for cooling is reduced due to the air resistance of the air filter 29. However, since a minute foreign particle such as dust may be mixed in the air directly supplied from the air discharge opening 18a to the heating components 30, 31 and 32, it is necessary to provide the air filter 29 so that circuit elements are not damaged. In the structure shown in FIG. 12, in a case where there is no electronic circuit part and air is supplied to the heat receiving part 26 that is a radiator for heat dissipation, there is little problem of mixture of dust. Hence, it is sufficient to prevent the entry of foreign particles by punching a metal state shield plate which is provided at the air intake opening of the duct 18.

Figure 13:
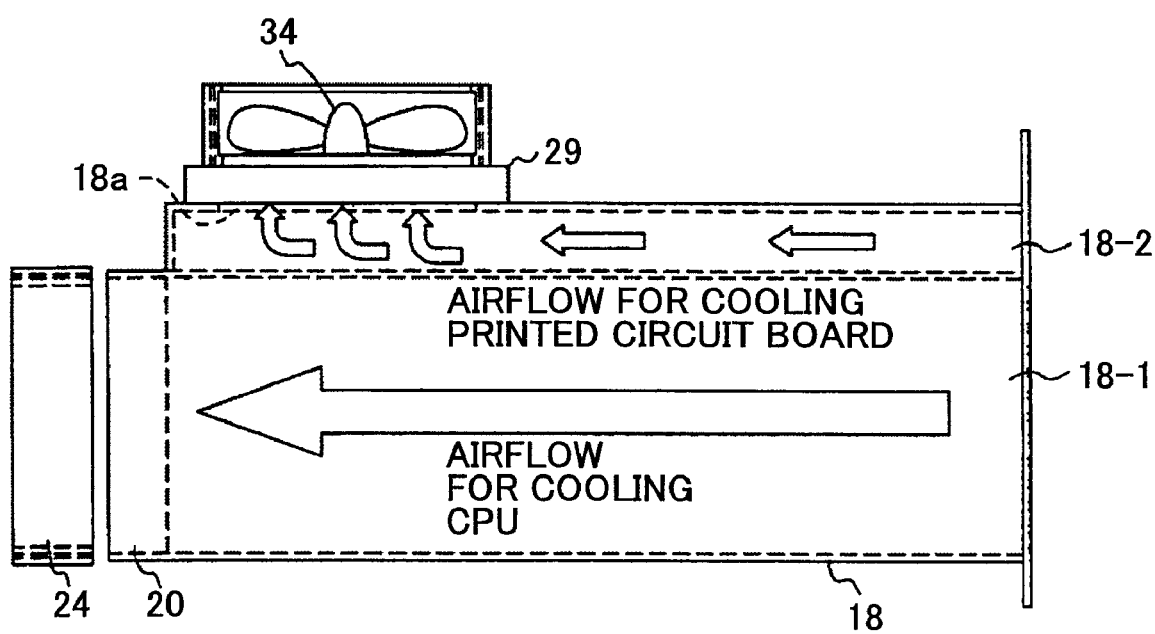
FIG. 13 is a schematic diagram showing airflow and the structure of a duct of another embodiment of the present invention.

FIG. 13 shows a structure where the fan 34 is arranged at the air discharge opening 18a of the supplemental duct 18-2 shown in FIG. 11 via the air filter 29. In a case where the supplemental duct 18-2 is provided separately from the duct main body 18-1, the air filter of the duct at a side of the heat receiving part 26 can be omitted by providing the air filter 29 at the air discharge opening 18a or the air intake opening of the supplemental duct 18-2 at a side where air is supplied to the circuit components 30, 31 and 32. As a result of this, it is possible to improve the cooling effect at the CPU.

The present invention is not limited to these embodiments, but variations and modifications may be made without departing from the scope of the present invention.

This patent application is based on Japanese Priority Patent Application No. 2005-310548 filed on Oct. 25, 2005, the entire contents of which are hereby incorporated by reference.

What is claimed is:

1. An information processing device, comprising:
   a housing part;
   a heating part arranged in the housing part;
   a cooling unit configured to cool the heating part;
   an airflow supplying member configured to supply an airflow to a part of the cooling unit; and
   an airflow limitation member configured to limit the airflow supplied by the airflow supplying member;
   wherein an air intake part is provided in one surface of the housing part so as to intake air into the airflow limitation member;
   an air discharge part is provided in another surface of the housing part so as to discharge air cooling the part of the cooling unit;
   the airflow limitation member includes a duct main body and a supplemental duct;
   the duct main body and the part of the cooling unit are arranged in series; and
   the supplemental duct is connected to an air discharge opening provided at one side surface of the airflow limitation member.

2. An information processing device, comprising:
   a housing part;
   a heating part arranged in the housing part;
   a cooling unit configured to cool the heating part;
   an airflow supplying member configured to supply an airflow to a part of the cooling unit; and
   an airflow limitation member configured to limit the airflow supplied by the airflow supplying member;
   wherein an air intake part is provided in one surface of the housing part so as to intake air into the airflow limitation member;
   an air discharge part is provided in another surface of the housing part so as to discharge air cooling the part of the cooling unit;
   the airflow limitation member includes a duct main body and a supplemental duct;
   the duct main body and the part of the cooling unit are arranged in series; and
   the supplemental duct is connected to an air discharge opening provided at one side surface of the airflow limitation member and an air filter is provided at the air discharged opening.

3. A manufacturing method of an information processing device, the information processing device including:
   a housing part;
   a heating;
   a cooling unit configured to cool the heating part;
   an airflow supplying member configured to supply an airflow to a part of the cooling unit; and
   an airflow limitation member configured to limit the airflow supplied by the airflow supplying member;
   wherein an air intake part is provided in one surface of the housing part so as to intake air into the airflow limitation member;
   an air discharge part is provided in another surface of the housing part so as to discharge air cooling the part of the cooling unit;
   the airflow limitation member includes a duct main body and a supplemental duct;
   the duct main body and the part of the cooling unit are arranged in series; and
   the supplemental duct is connected to an air discharge opening provided at one side surface of the airflow limitation member;

the manufacturing method comprising the steps of:
providing the heating part in the housing part;
providing the part of the cooling unit configured to cool the heating part and the airflow supplying member configured to supply the airflow to the part of the cooling unit, in a cooling unit fixing part having a receiving part;
contacting another part of the cooling unit to the heating part;
providing the airflow limitation member having a structure where a designated notch part is provided at a side contacting the cooling unit fixing part at a side opposite to a side where the notch part is provided; and
covering the notch part of the airflow limitation member with the receiving part of the cooling unit fixing part.

4. The information processing device as claimed in claim 1, wherein the housing part includes a second air intake part different from the air intake part and a second air discharge part different from the air discharge part; and
heat generated at the heating part and a part other than the heating part is discharged from the second air discharge part to an outside of the housing part.

5. The information processing device as claimed in claim 1,
wherein the airflow limitation member includes a notch part; and
the airflow supplying member or the cooling unit and a bottom surface of the airflow limitation member do not come in contact with each other when the airflow limitation member is installed.

6. The information processing device as claimed in claim 1,
wherein a cooling unit fixing part is provided so as to fix a part of the cooling unit; and
the cooling unit fixing part includes a receiving part as a lid for a notch part provided at the airflow limitation member.

7. The information processing device as claimed in claim 1,
wherein the airflow supplying member has a structure where an internal diameter at a side of the air intake part is larger than an internal diameter at a side of the air discharge part.

* * * * *